US011434987B2

(12) United States Patent
Leque et al.

(10) Patent No.: US 11,434,987 B2
(45) Date of Patent: Sep. 6, 2022

(54) INTERNALLY DAMPED GEAR

(71) Applicant: UNITED TECHNOLOGIES CORPORATION, Farmington, CT (US)

(72) Inventors: Nicholas D. Leque, Vernon, CT (US); Joseph H. Polly, Tolland, CT (US)

(73) Assignee: RAYTHEON TECHNOLOGIES CORPORATION, Farmington, CT (US)

( * ) Notice: Subject to any disclaimer, the term of this patent is extended or adjusted under 35 U.S.C. 154(b) by 220 days.

(21) Appl. No.: 16/673,423

(22) Filed: Nov. 4, 2019

(65) Prior Publication Data

US 2021/0131548 A1 May 6, 2021

(51) Int. Cl.
| F16H 55/14 | (2006.01) |
| F16H 55/06 | (2006.01) |
| F16H 55/17 | (2006.01) |

(52) U.S. Cl.
CPC ............ *F16H 55/14* (2013.01); *F16H 55/06* (2013.01); *F16H 55/17* (2013.01)

(58) Field of Classification Search
CPC ........... F16H 55/14; F16H 55/06; F16H 55/17
See application file for complete search history.

(56) References Cited

U.S. PATENT DOCUMENTS

| 4,406,202 A | | 9/1983 | Salje et al. | |
| 4,691,589 A | * | 9/1987 | Arakawa | F16F 9/12 |
| | | | | 464/180 |
| 5,062,917 A | * | 11/1991 | Zodrow | B65C 9/16 |
| | | | | 156/568 |
| 5,092,192 A | * | 3/1992 | Pelzer | F16H 55/14 |
| | | | | 74/443 |
| 5,452,622 A | * | 9/1995 | Fenelon | B29C 70/84 |
| | | | | 264/242 |
| 6,274,074 B1 | | 8/2001 | Monie | |
| 2002/0078777 A1 | * | 6/2002 | Witucki | F16H 55/14 |
| | | | | 74/461 |
| 2010/0304907 A1 | * | 12/2010 | Yuan | F16H 55/14 |
| | | | | 474/161 |
| 2018/0017150 A1 | | 1/2018 | Leupold et al. | |
| 2019/0136958 A1 | | 5/2019 | Miller et al. | |
| 2021/0180675 A1 | * | 6/2021 | Bartolomeo | B33Y 70/00 |

FOREIGN PATENT DOCUMENTS

| CN | 107177794 | 9/2017 |
| GB | 1602281 | 11/1981 |

OTHER PUBLICATIONS

European Patent Office, European Search Report dated Apr. 8, 2021 in Application No. 20205530.7.

* cited by examiner

*Primary Examiner* — Victor L MacArthur
*Assistant Examiner* — Gregory T Prather
(74) *Attorney, Agent, or Firm* — Snell & Wilmer L.L.P.

(57) ABSTRACT

A damping apparatus includes a first sidewall defining a centerline axis, a second sidewall disposed coaxial with the first sidewall, a main cavity defined between the first sidewall and the second sidewall, and a damping material disposed in the main cavity.

14 Claims, 6 Drawing Sheets

INTERNALLY DAMPED GEAR

FIELD

This disclosure relates generally to gears, and more particularly to systems and methods for damping gears.

BACKGROUND

Various systems, including gas turbine engine systems, typically include gearboxes that transfer energy from one shaft to another shaft. Gear vibrations can have undesirable consequences. A resonant condition can result in damaging vibration amplitudes. Two solutions to gear vibration are to either redesign the geometry to move responding modes out the operating range, or to add a friction (ring) damper to dissipate vibration energy. Both methods are associated with careful tuning of the system so that new vibration modes are not introduced and both may be limited by the design space available.

SUMMARY

A damping apparatus is disclosed, comprising a first sidewall defining a centerline axis, a second sidewall disposed coaxial with the first sidewall, a main cavity defined between the first sidewall and the second sidewall, and a damping material disposed in the main cavity.

In various embodiments, the damping material comprises a polymer.

In various embodiments, the damping material comprises a viscoelastic material.

In various embodiments, the damping material comprises a thermoplastic.

In various embodiments, the damping apparatus further comprises a first aperture disposed in the first sidewall.

In various embodiments, the damping apparatus further comprises a second aperture disposed in at least one of the first sidewall or the second sidewall.

In various embodiments, the second aperture is configured to provide a visual aid for determining whether the main cavity has been filled with the damping material.

In various embodiments, the damping apparatus further comprises a dividing wall disposed between the first sidewall and the second sidewall, the dividing wall separates the main cavity into a first chamber and a second chamber, and the second aperture is disposed in the second sidewall.

In various embodiments, the damping apparatus further comprises a third aperture disposed in the dividing wall, wherein the first chamber is in fluid communication with the second chamber via the third aperture.

In various embodiments, the damping material is adhered to the first sidewall and the second sidewall.

An internally damped gear is disclosed, comprising a hub defining a centerline axis, a first sidewall extending radially outward from the hub, a second sidewall extending radially outward from the hub, a main cavity defined between the first sidewall and the second sidewall, a damping material disposed in the main cavity, and a toothed ring disposed coaxial with the hub, wherein the first sidewall and the second sidewall extend radially inward from the toothed ring.

In various embodiments, the toothed ring is coupled to the first sidewall and the second sidewall via at least one of a weld, a braze, or a solder.

In various embodiments, the damping material comprises a polymer.

In various embodiments, the main cavity is filled with the damping material.

In various embodiments, the internally damped gear further comprises a first aperture disposed in the first sidewall configured to provide an inlet whereby the damping material is moved into the main cavity during manufacture of the internally damped gear.

In various embodiments, the internally damped gear further comprises a second aperture disposed in at least one of the first sidewall or the second sidewall configured to provide a vent for the main cavity in response to the damping material being moved into the main cavity during manufacture of the internally damped gear.

In various embodiments, the second aperture is configured to provide a visual aid for determining whether the main cavity has been filled with the damping material.

In various embodiments, the internally damped gear further comprises a dividing wall disposed between the first sidewall and the second sidewall, the dividing wall separates the main cavity into a first chamber and a second chamber, and the second aperture is disposed in the second sidewall.

In various embodiments, the internally damped gear further comprises a third aperture disposed in the dividing wall, wherein the first chamber is in fluid communication with the second chamber via the third aperture, and the third aperture and the first aperture are staggered.

A method for manufacturing an internally damped gear is disclosed, comprising forming a first sidewall and a second sidewall, wherein a main cavity is defined between the first sidewall and the second sidewall, coupling the first sidewall and the second sidewall to a toothed ring, wherein the first sidewall and the second sidewall extend radially inward from the toothed ring, and filling the main cavity with a damping material.

The foregoing features and elements may be combined in various combinations without exclusivity, unless expressly indicated otherwise. These features and elements as well as the operation thereof will become more apparent in light of the following description and the accompanying drawings. It should be understood, however, the following description and drawings are intended to be exemplary in nature and non-limiting.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the detailed description and claims when considered in connection with the drawing figures, wherein like numerals denote like elements.

DETAILED DESCRIPTION

The detailed description of exemplary embodiments herein makes reference to the accompanying drawings, which show exemplary embodiments by way of illustration. While these exemplary embodiments are described in sufficient detail to enable those skilled in the art to practice the disclosure, it should be understood that other embodiments may be realized and that logical changes and adaptations in design and construction may be made in accordance with this disclosure and the teachings herein. Thus, the detailed description herein is presented for purposes of illustration only and not of limitation. The scope of the disclosure is defined by the appended claims. For example, the steps recited in any of the method or process descriptions may be executed in any order and are not necessarily limited to the order presented. Furthermore, any reference to singular includes plural embodiments, and any reference to more than one component or step may include a singular embodiment or step. Also, any reference to attached, fixed, connected or the like may include permanent, removable, temporary, partial, full and/or any other possible attachment option. Additionally, any reference to without contact (or similar phrases) may also include reduced contact or minimal contact. Surface shading lines may be used throughout the figures to denote different parts but not necessarily to denote the same or different materials. In some cases, reference coordinates may be specific to each figure.

As used herein, "aft" refers to the direction associated with the tail (e.g., the back end) of an aircraft, or generally, to the direction of exhaust of the gas turbine. As used herein, "forward" refers to the direction associated with the nose (e.g., the front end) of an aircraft, or generally, to the direction of flight or motion.

A damping apparatus, as described herein, may include a cavity filled with a damping material configured to dampen vibration of the damping apparatus. The damping material may be coupled to inner surfaces of the damping apparatus. Shear forces may be transferred between the damping material and the damping apparatus which the damping material tends to mitigate to reduce vibration.

Figures 1A, 1B:
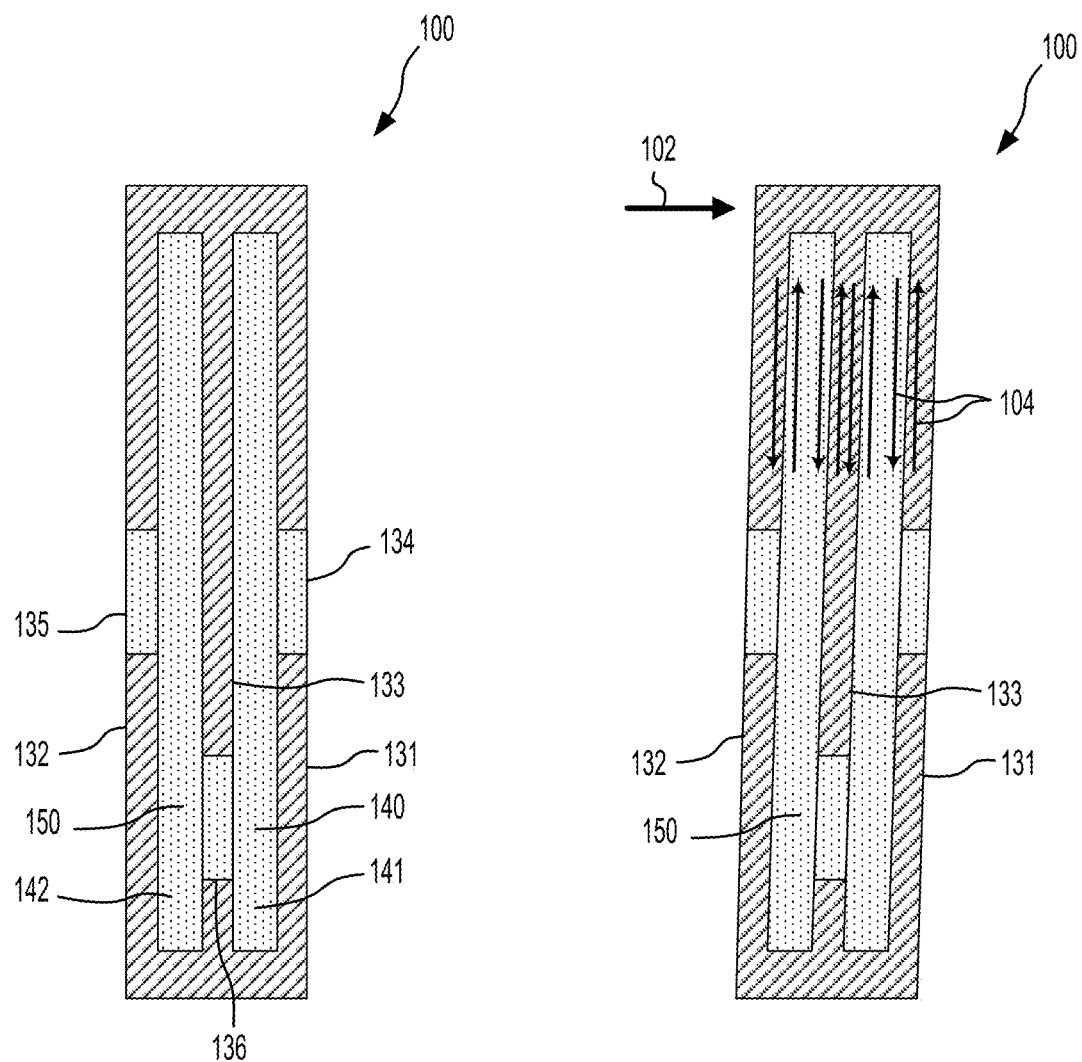
FIG. 1A illustrates a section, schematic view of a damping apparatus having a cavity filled with a viscoelastic damping material, in accordance with various embodiments.
FIG. 1B illustrates a section, schematic view of the damping apparatus of FIG. 1A with the viscoelastic damping material dampening bending of the damping apparatus via shear forces between the damping material and the inner surfaces of the damping apparatus, in accordance with various embodiments.

With reference to FIG. 1A, a schematic view of a damping apparatus 100 is illustrated, in accordance with various embodiments. Damping apparatus 100 may generally comprise a first sidewall 131, a second sidewall 132, a main cavity 140 defined between the first sidewall 131 and the second sidewall 132, and a damping material 150 disposed in the main cavity. In various embodiments, damping apparatus 100 further comprises a dividing wall 133 disposed between the first sidewall 131 and the second sidewall 132. Dividing wall 133 may separate the main cavity 140 into a first chamber 141 and a second chamber 142. The damping material 150 may fill main cavity 140 such that the damping material 150 interface with the surfaces of the first sidewall 131, second sidewall 132, and dividing wall 133. In this regard, the damping material 150 contacts the surfaces of the first sidewall 131, second sidewall 132, and dividing wall 133. The damping material 150 may bond and/or adhere to the surfaces of the first sidewall 131, second sidewall 132, and dividing wall 133 such that the damping material dissipates energy when loads are transferred from damping apparatus 100 to damping material 150 via the first sidewall 131, second sidewall 132, and dividing wall 133. The damping material 150 may "wet" the surfaces of the first sidewall 131, second sidewall 132, and dividing wall 133, whereby the damping material 150 maintains contact with said surfaces, resulting from intermolecular interactions when the damping material 150 and said surfaces are brought into contact.

With reference to FIG. 1B, damping apparatus 100 may deform during operation. The illustrated embodiment shows the top end of damping apparatus 100 leaning in the direction of arrow 102. For example, damping apparatus 100 may tend to deflect, bend, or deform during rotation of damping apparatus 100 as a result of resonant vibration. As damping apparatus 100 deforms, the body of damping apparatus 100 (e.g., first sidewall 131, second sidewall 132, and dividing wall 133) may tend to exert a shearing force into damping material 150 as illustrated by the arrows 104 in FIG. 1B. The damping material 150 tends to resist the shearing forces which tends to dampen the deformation (e.g., vibration) of damping apparatus 100.

Figure 2:
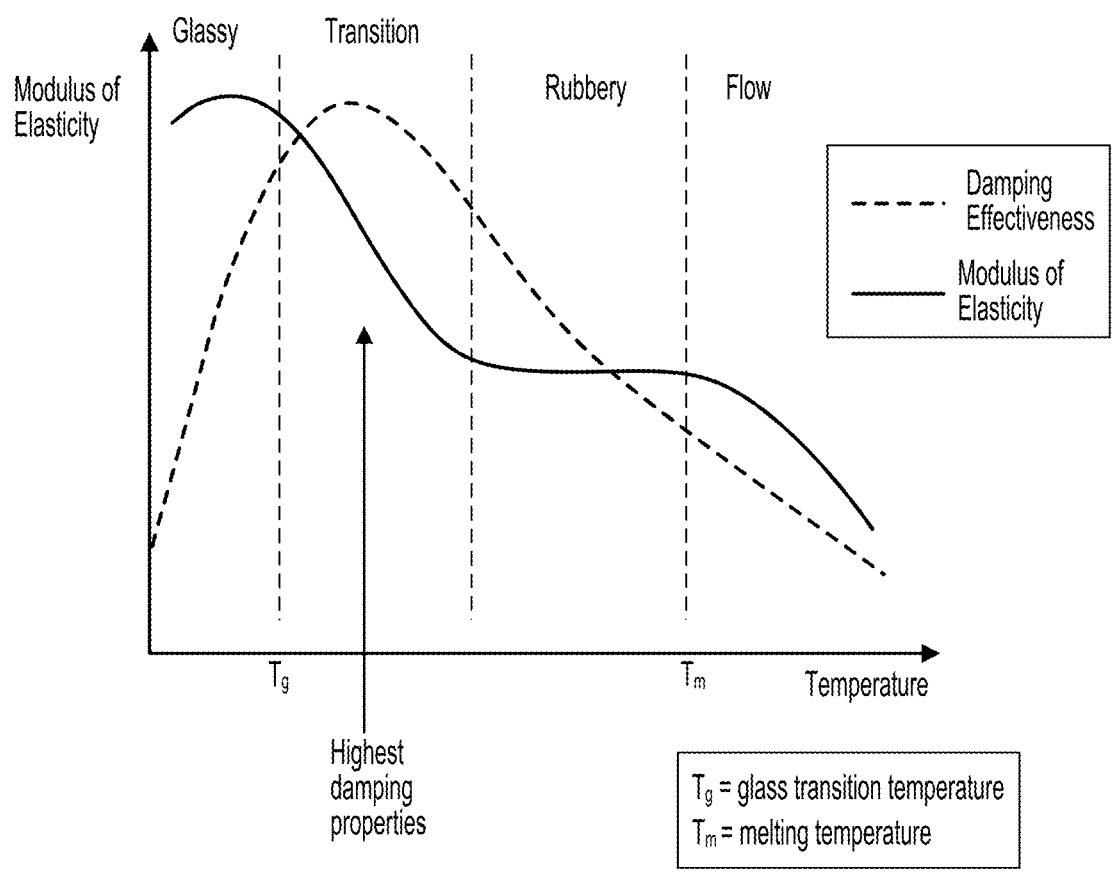
FIG. 2 illustrates a plot of damping effectiveness and modulus of elasticity of a viscoelastic damping material with respect to temperature, in accordance with various embodiments.

In various embodiments, damping material 150 comprises a viscoelastic material, such as an amorphous polymer. In various embodiments, damping material 150 comprises a thermoplastic. In various embodiments, damping material 150 comprises a viscoelastic material such as a silicone-polymer, or an amorphous polystyrene, among others. The particular type of damping material may be chosen based on the operating temperature of the damping apparatus 100. For example, with momentary reference to FIG. 2, a viscoelastic damping material may comprise a modulus of elasticity which varies with temperature. The damping effectiveness of the viscoelastic damping material may be greatest when the viscoelastic damping material is in its transition phase. Therefore, if the damping apparatus 100 operates at a temperature of between 200 and 250° F. (93-121° C.), then a damping material which is in its transition phase at a temperature of between 200 and 250° F. (93-121° C.) may be selected for suitable damping performance. In this example, the glass transition temperature ($T_g$) of the damping material may be selected to be less than 200° F. and the melting temperature ($T_m$) of the damping material may be selected to be well over 250° F. such that the damping material is not at risk of melting during operation of the damping apparatus 100.

With reference again to FIG. 1A, a first aperture 134 may be disposed in the first sidewall 131. First aperture 134 may provide an inlet whereby the damping material 150 is moved into the main cavity 140 during manufacture of the damping apparatus 100. A second aperture 135 may be disposed in the second sidewall 132. Second aperture 135 may provide a vent, or an outlet, for the main cavity 140 while the main cavity is being filled with the damping material 150. Second aperture 135 may provide an outlet whereby the damping material 150 exits the main cavity 140 during manufacture of the damping apparatus 100. In various embodiments, and in response to damping material 150 exiting second aperture 135, it may be determined that the main cavity 140 is filled with the damping material 150. In this regard, second aperture 135 may provide a visual aid for determining whether the main cavity has been filled with the damping material.

A third aperture 136 may be disposed in dividing wall 133 whereby the first chamber 141 is in fluid communication with the second chamber 142. The third aperture 136 may be staggered from the first aperture 134. In this manner, the dividing wall 133 provides a backstop to first aperture 134 to aid in filling the main cavity with the damping material 150. For example, staggering the third aperture 136 with respect to the first aperture 134 may prevent damping material 150 from spilling out the second aperture 135 during the filling process.

With reference to FIG. 3A through FIG. 3E, a gear 200 (also referred to herein as an internally damped gear) is illustrated, in accordance with various embodiments. Gear 200 generally comprises a toothed ring 210 defining a centerline axis 290, a hub 220, and a web 230 extending between the toothed ring 210 and the hub 220. Hub 220 may comprise a cylindrical member. In various embodiments, hub 220 comprises a shaft. Hub 220 may be formed from a metal. Web 230 may extend radially outward from hub 220. Web 230 may extend radially inward from toothed ring 210. In this regard, web 230 may comprise a disc shape. Hub 220 may be coaxial with toothed ring 210. Web 230 may be coaxial with toothed ring 210. In this regard, toothed ring 210, hub 220, and web 230 may be in concentric alignment. Gear 200 may be configured to rotate about centerline axis 290.

Figure 3A:
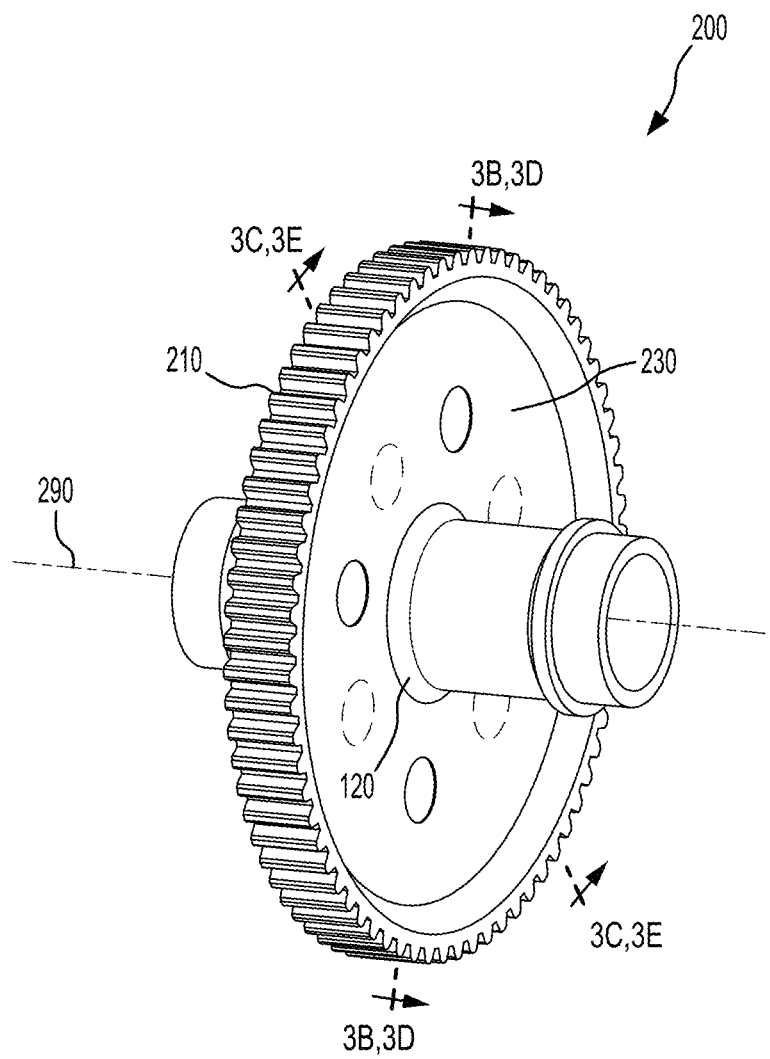
FIGS. 3A, 3B, 3C, 3D, and 3E illustrate an internally damped gear, in accordance with various embodiments.
Figure 3B:
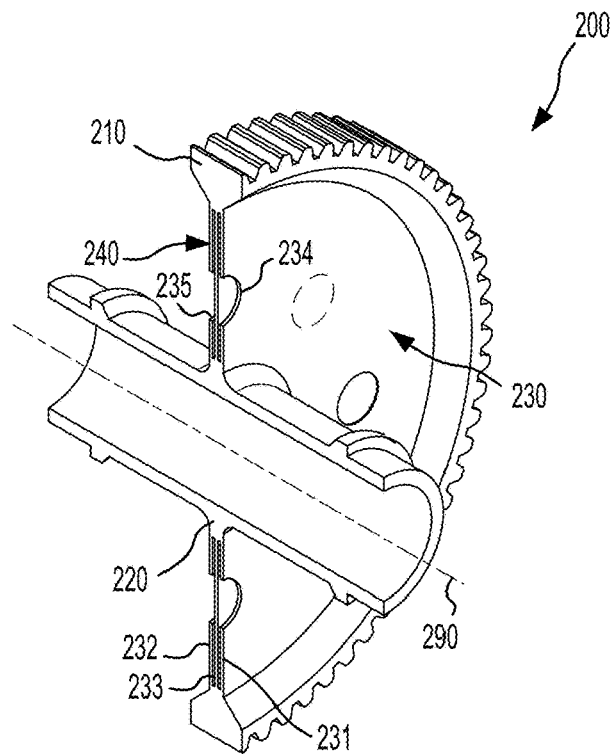
Figure 3C:
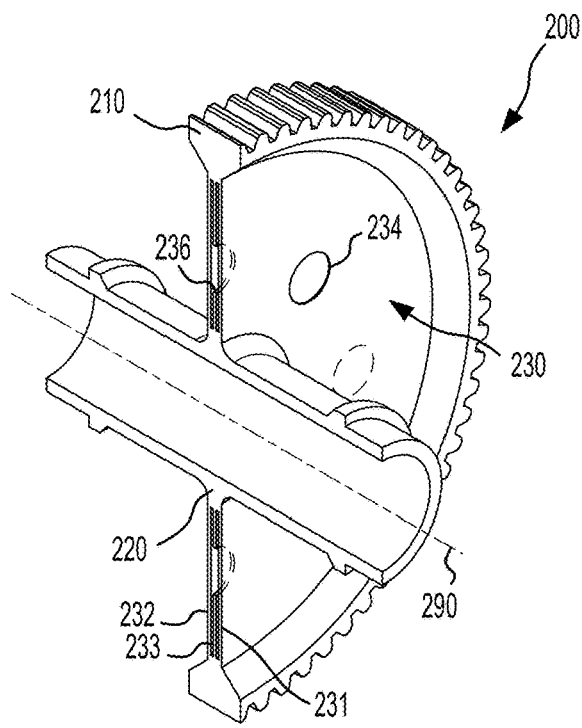
Figure 3D:
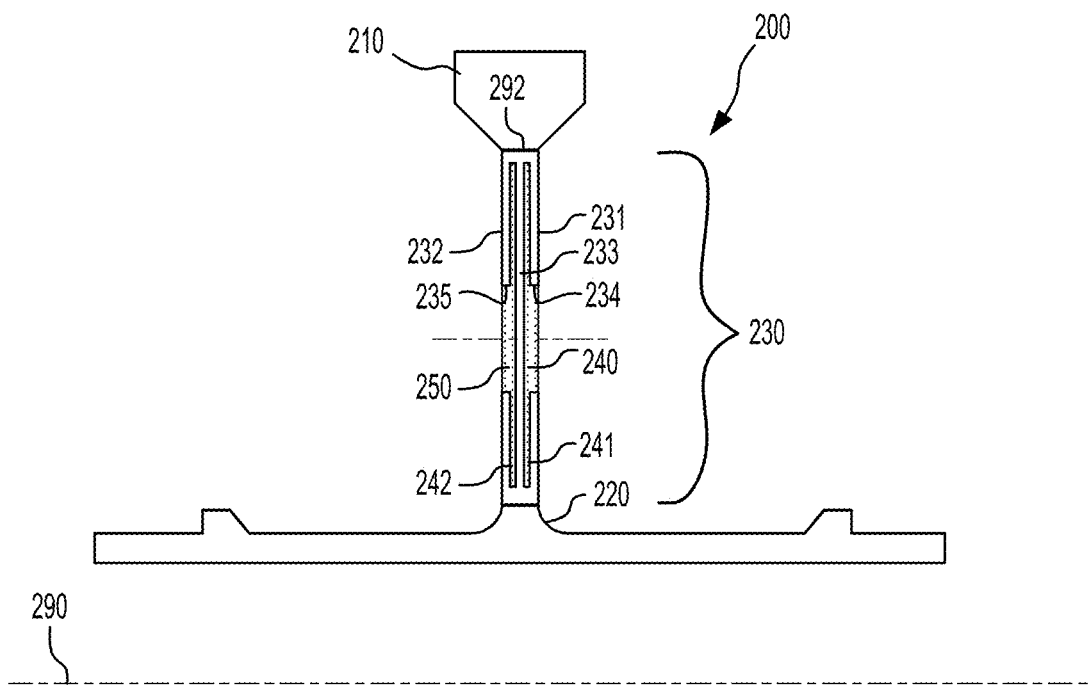
Figure 3E:
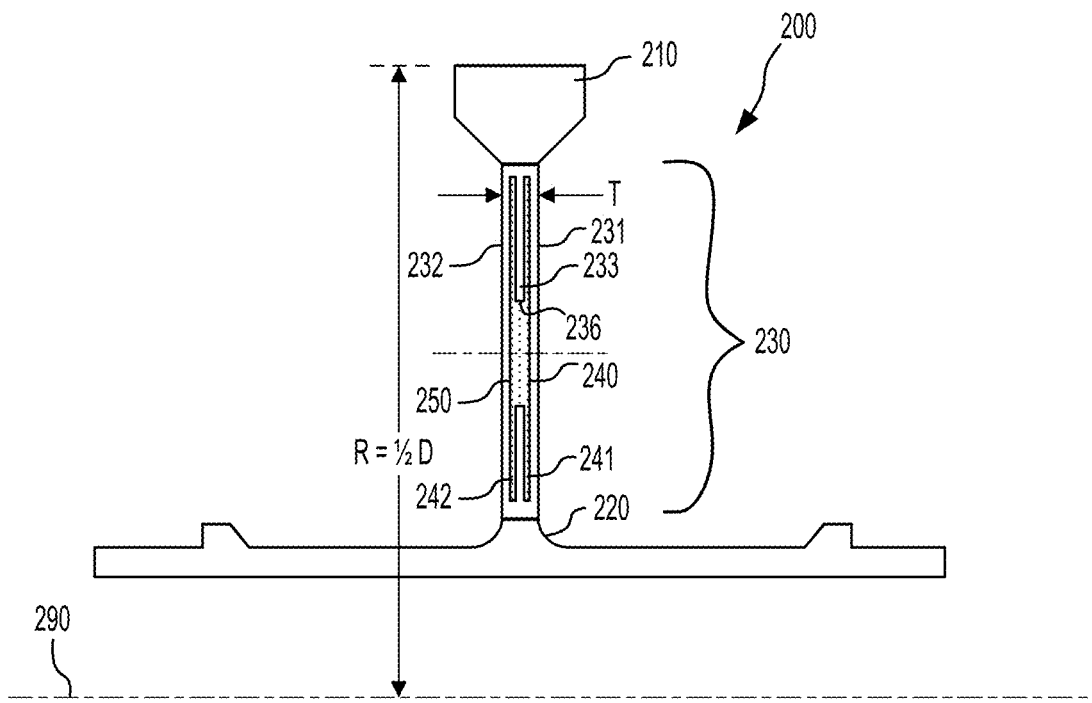

With particular focus on FIG. 3B and FIG. 3C, web 230 may comprise a sidewall 231 (also referred to herein as a first sidewall) and a sidewall 232 (also referred to herein as a second sidewall). Sidewall 231 and sidewall 232 may be in concentric alignment about centerline axis 290. Sidewall 231 and sidewall 232 may define a main cavity 240 disposed therebetween. Main cavity 240 may be filled with a damping material 250 (see FIG. 3D and FIG. 3E). Web 230 may further comprise a dividing wall 233 disposed between sidewall 231 and sidewall 232. Sidewall 231, sidewall 232, and dividing wall 233 may be in concentric alignment about centerline axis 290. Damping material 250 may be the same as damping material 150 (see FIG. 1A through FIG. 2).

In various embodiments, a first aperture 234 may be disposed in the first sidewall 231. First aperture 234 may provide an inlet whereby the damping material 250 is moved into the main cavity 240 during manufacture of the gear 200. A second aperture 235 may be disposed in the second sidewall 232. Second aperture 235 may provide a vent, or an outlet, for the main cavity 240 while the main cavity is being filled with the damping material 250. Second aperture 235 may provide an outlet whereby the damping material 250 exits the main cavity 240 during manufacture of the gear 200. In various embodiments, and in response to damping material 250 exiting second aperture 235, a manufacturer may determine that the main cavity 240 is filled with the damping material 250. In this regard, second aperture 235 may provide a visual aid for determining whether the main cavity has been filled with the damping material.

A third aperture 236 may be disposed in dividing wall 233 whereby the first chamber 241 is in fluid communication with the second chamber 242. The third aperture 236 may be staggered from the first aperture 234. In this manner, the dividing wall 233 provides a backstop to first aperture 234 to aid in filling the main cavity 240 with the damping material 250. For example, staggering the third aperture 236 with respect to the first aperture 234 may prevent damping material 250 from spilling out the second aperture 235 during the filling process.

Systems and methods for internally damped gears, as provided herein, may be particularly useful for thin-walled gears, in accordance with various embodiments. In this regard, the term "thin-walled" may refer to a web 230 having a total thickness T, measured parallel centerline axis 290, which is less than one tenth the total diameter D of gear 200 (T<$\frac{1}{10}$*D). In various embodiments, thickness T of web 230 may be between a one hundredth and one fifteenth the total diameter D of gear 200 ($\frac{1}{100}$*D≤T≤$\frac{1}{15}$*D). In various embodiments, thickness T of web 230 may be between a one sixtieth and one twentieth the total diameter D of gear 200 ($\frac{1}{60}$*D≤T≤$\frac{1}{20}$*D). In various embodiments, total thickness T is the maximum thickness of web 230.

Figure 4:
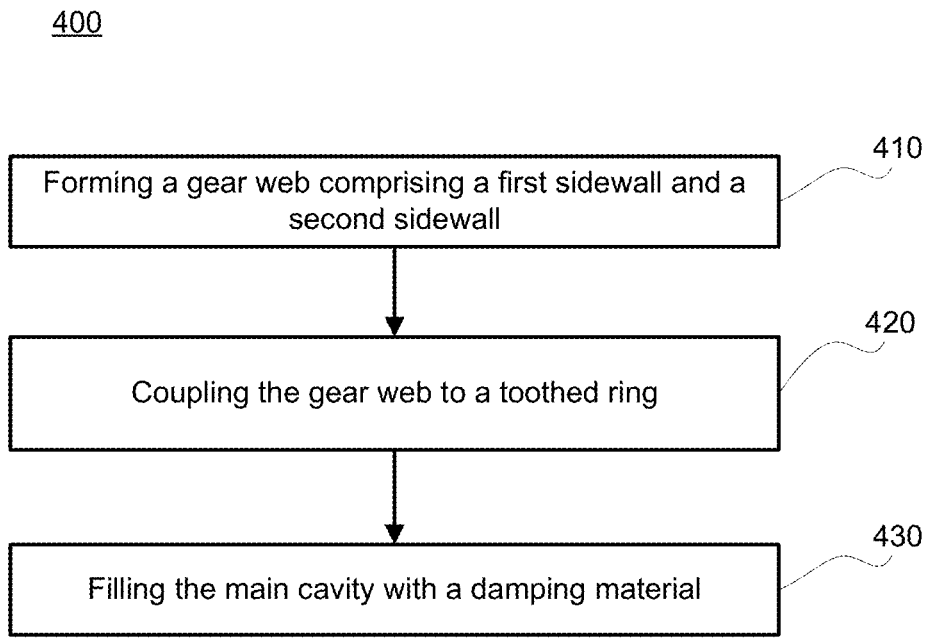
FIG. 4 illustrates a flow chart for a method for manufacturing an internally damped gear, in accordance with various embodiments.

With reference to FIG. 4, a method 400 for manufacturing an internally damped gear is provided, in accordance with various embodiments. Method 400 includes forming a web comprising a first sidewall and a second sidewall (step 410), wherein a main cavity is defined between the first sidewall and the second sidewall. Method 400 includes coupling the first sidewall and the second sidewall to a toothed ring (step 420), wherein the first sidewall and the second sidewall extend radially inward from the toothed ring. Method 400 includes filling the main cavity with a damping material (step 430).

With combined reference to FIG. 3A and FIG. 4, step 410 may include forming web 230 via an additive manufacturing process. As used herein, the term "additive manufacturing" encompasses any method or process whereby a three-dimensional object is produced by creation of a substrate or material to an object, such as by addition of successive layers of a material to an object to produce a manufactured product having an increased mass or bulk at the end of the additive manufacturing process than the beginning of the process. In contrast, traditional manufacturing (e.g., forms of subtractive manufacturing) by machining or tooling typically relies on material removal or subtractive processes, such as cutting, lathing, drilling, grinding, and/or the like, to produce a final manufactured object that has a decreased mass or bulk relative to the starting workpiece. Other traditional manufacturing methods includes forging or casting, such as investment casting, which utilizes the steps of creating a form, making a mold of the form, and casting or forging a material (such as metal) using the mold. As used herein, the term "additive manufacturing" should not be construed to encompass fabrication or joining of previously formed objects.

A variety of additive manufacturing technologies are commercially available. Such technologies include, for example, fused deposition modeling, polyjet 3D printing, electron beam freeform fabrication, direct metal laser sintering, electron-beam melting, selective laser melting, selective heat sintering, selective laser sintering, stereolithography, multiphoton photopolymerization, and digital light processing. These technologies may use a variety of materials as substrates for an additive manufacturing process, including various plastics and polymers, metals and metal alloys, ceramic materials, metal clays, organic materials, and the like. Any method of additive manufacturing and associated compatible materials, whether presently available or yet to be developed, are intended to be included within the scope of the present disclosure.

During additive manufacturing, web 230 may be filled with a powder filler (e.g., during a powder bed fusion process). In this regard, step 410 may further include removing the powder filler from the main cavity 240 of the web 230.

Step 420 may include coupling web 230 to toothed ring 210 via a metal joining process, such as via a welding process, a brazing process, or a soldering process. In this regard, and with momentary reference to FIG. 3D, web 230 may be coupled to toothed ring 210 via a weld 292. In this regard, toothed ring 210 may be made from a metal material. Furthermore, web 230 may be formed from a metal material. In various embodiments, it may be desirable to heat treat web 230 and/or toothed ring 210. In this regard, step 420 may further include heat treating web 230 and toothed ring 210 using conventional heat treat methods in order to increase the hardness of toothed ring 210 for example.

In various embodiments, web 230 may be coupled to hub 220 via a metal joining process. In various embodiments, web 230 and hub 220 are manufactured as a single, monolithic piece via the additive manufacturing process. In this manner, complex geometries desired for the web 230 are achievable using additive manufacturing, while also utilizing toothed ring 210 having a desired strength and wear resistance. Furthermore, in this manner, the toothed ring 210 is rigidly coupled to the hub 220.

Step 430 may include filling the main cavity 240 with a damping material 250. A damping material may be heated at or above a melting temperature in order to get the damping material 250 to flow. Damping material 250 may be injected into first aperture 234 and may fill first chamber 241 and second chamber 242 of main cavity 240. After the main cavity 240 is filled, the temperature of the damping material 250 may be decreased such that the damping material 250 is hardened and solidifies and is mechanically locked and retained within main cavity 240.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Systems, methods and apparatus are provided herein. In the detailed description herein, references to "one embodiment", "an embodiment", "various embodiments", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element herein is intended to provoke 35 U.S.C. 112(f), unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A damping apparatus, comprising:
   a hub defining a centerline axis;
   a first sidewall defining a centerline axis;
   a second sidewall disposed coaxial with the first sidewall;
   a main cavity defined between the first sidewall and the second sidewall; and
   a damping material disposed in the main cavity;
   a toothed ring disposed coaxial with the hub;
   a first aperture disposed in the first sidewall configured to provide an inlet whereby the damping material is moved into the main cavity during manufacture of the damping apparatus;
   a second aperture disposed in the second sidewall configured to provide a vent for the main cavity in response to the damping material being moved into the main cavity during manufacture of the damping apparatus; and
   a dividing wall disposed between the first sidewall and the second sidewall, the dividing wall separates the main cavity into a first chamber and a second chamber;
   wherein the first sidewall and the second sidewall extend radially inward from the toothed ring to the hub.

2. The damping apparatus of claim 1, wherein the damping material comprises a polymer.

3. The damping apparatus of claim 2, wherein the damping material comprises a viscoelastic material.

4. The damping apparatus of claim 3, wherein the damping material is adhered to the first sidewall and the second sidewall.

5. The damping apparatus of claim 2, wherein the damping material comprises a thermoplastic.

6. The damping apparatus of claim 1, wherein the second aperture is configured to provide a visual aid for determining whether the main cavity has been filled with the damping material.

7. The damping apparatus of claim 1, further comprising a third aperture disposed in the dividing wall, wherein the first chamber is in fluid communication with the second chamber via the third aperture.

8. An internally damped gear, comprising:
   a hub defining a centerline axis;
   a first sidewall extending radially outward from the hub;
   a second sidewall extending radially outward from the hub;
   a main cavity defined between the first sidewall and the second sidewall;
   a damping material disposed in the main cavity;
   a toothed ring disposed coaxial with the hub; a first aperture disposed in the first sidewall;
   a second aperture disposed in the second sidewall;
   a dividing wall disposed between the first sidewall and the second sidewall, the dividing wall separates the main cavity into a first chamber and a second chamber, the dividing wall extends radially inward from the toothed ring to the hub;
   wherein the first sidewall and the second sidewall extend radially inward from the toothed ring to the hub.

9. The internally damped gear of claim 8, wherein the toothed ring is coupled to the first sidewall and the second sidewall via at least one of a weld, a braze, or a solder.

10. The internally damped gear of claim 8, wherein the damping material comprises a polymer.

11. The internally damped gear of claim 8, wherein the main cavity is filled with the damping material.

12. The internally damped gear of claim 8, wherein the second aperture is configured to provide a visual aid for determining whether the main cavity has been filled with the damping material.

13. The internally damped gear of claim 8, further comprising a third aperture disposed in the dividing wall, wherein the first chamber is in fluid communication with the second chamber via the third aperture, and the third aperture and the first aperture are staggered.

14. A method for manufacturing an internally damped gear, comprising:
- forming a first sidewall and a second sidewall, wherein a main cavity is defined between the first sidewall and the second sidewall, a first aperture is disposed in the first sidewall, and a second aperture is disposed in the second sidewall;
- forming a dividing wall disposed between the first sidewall and the second sidewall, the dividing wall separates the main cavity into a first chamber and a second chamber;
- coupling the first sidewall and the second sidewall to a toothed ring and a hub, wherein the first sidewall, the dividing wall, and the second sidewall extend radially inward from the toothed ring to the hub; and
- filling the main cavity with a damping material.

* * * * *